(12) United States Patent
Longoria et al.

(10) Patent No.: US 6,271,289 B1
(45) Date of Patent: Aug. 7, 2001

(54) STAIN RESISTANT COMPOSITIONS

(75) Inventors: John Mark Longoria; Michael Joseph Michalczyk, both of Wilmington, DE (US); John J. Fitzgerald, Boothwyn, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/687,030

(22) Filed: Oct. 13, 2000

Related U.S. Application Data

(63) Continuation-in-part of application No. 09/441,320, filed on Nov. 16, 1999, now abandoned.

(51) Int. Cl.⁷ .............................. C08K 5/52; C08K 5/49; B05D 3/02; B32B 27/00
(52) U.S. Cl. ................. 524/133; 252/8.61; 252/8.62; 427/393.6; 428/422; 524/139; 524/144; 524/117
(58) Field of Search .................... 524/130, 133, 524/139, 117, 144; 427/393.6; 428/422; 252/8.61, 8.62; 526/243, 245

(56) References Cited

U.S. PATENT DOCUMENTS

| | | | |
|---|---|---|---|
| 3,083,224 | * | 3/1963 | Brace et al. .................... 558/165 |
| 3,094,547 | * | 6/1963 | Heine ............................ 558/165 |
| 3,282,905 | | 11/1966 | Fasick et al. . |
| 3,378,609 | | 4/1968 | Fasick et al. . |
| 3,385,812 | * | 5/1968 | Brachman .................... 558/165 |
| 3,839,254 | * | 10/1974 | Fang ............................ 524/144 |
| 4,013,627 | | 3/1977 | Temple . |
| 4,127,711 | | 11/1978 | Lori et al. . |
| 4,147,851 | | 4/1979 | Raynolds . |
| 4,366,299 | | 12/1982 | Dessaint . |
| 4,478,975 | | 10/1984 | Dessaint et al. . |
| 4,499,146 | | 2/1985 | Piacenti et al. . |
| 4,525,423 | | 6/1985 | Lynn et al. . |
| 4,579,924 | | 4/1986 | Schwartz et al. . |
| 4,595,428 | | 6/1986 | Anthony et al. . |
| 4,716,208 | | 12/1987 | Korzeniowski . |
| 4,931,505 | | 6/1990 | Miyazaki et al. . |
| 5,011,713 | | 4/1991 | Lenti et al. . |
| 5,091,550 | * | 2/1992 | Fang ............................ 558/165 |
| 5,247,008 | | 9/1993 | Michels et al. . |
| 5,387,640 | | 2/1995 | Michels et al. . |
| 5,439,998 | * | 8/1995 | Lina et al. .................... 428/422 |
| 5,558,940 | | 9/1996 | Micheis et al. . |
| 5,563,213 | | 10/1996 | Mayer . |
| 5,630,846 | * | 5/1997 | Hara et al. .................... 427/394 |
| 5,674,934 | | 10/1997 | Schmidt et al. . |
| 5,674,961 | | 10/1997 | Fitzgerald . |
| 5,872,180 | | 2/1999 | Michels et al. . |
| 6,037,429 | | 3/2000 | Linert et al. . |

FOREIGN PATENT DOCUMENTS

| | | |
|---|---|---|
| 2082569 | 11/1992 | (CA) . |
| 4426536 | 2/1996 | (DE) . |
| 4426537 | 2/1996 | (DE) . |
| 234 601 | 9/1983 | (EP) . |
| 124236 | 2/1984 | (EP) . |
| 554 667 | 8/1993 | (EP) . |
| 612770 | 8/1994 | (EP) . |
| 682 146A | 11/1995 | (EP) . |
| 692566 | 1/1996 | (EP) . |
| 2639353 | 5/1990 | (FR) . |
| 2 749 309 | 12/1997 | (FR) . |
| 50 010 280 | 6/1973 | (JP) . |
| 132729 | 5/1992 | (JP) . |
| WO 96/12059 | 4/1996 | (WO) . |
| WO 97/39072A | 10/1997 | (WO) . |
| WO 97/44375 | 11/1997 | (WO) . |
| WP 98/34718 | 8/1998 | (WO) . |

\* cited by examiner

*Primary Examiner*—Veronica P. Hoke

(57) ABSTRACT

A composition providing stain resistance to stone, masonry and other surfaces is provided comprising a mixture of a fluoroalkyl phosphate and a fluoroacrylate polymer.

13 Claims, No Drawings

STAIN RESISTANT COMPOSITIONS

This is a continuation-in-part of application Ser. No. 09/441,320 filed Nov. 16, 1999, now abondoned.

FIELD OF THE INVENTION

This invention relates to new aqueous fluorine-containing coatings that provide enhanced stain resistance to stone, masonry, and other surfaces

BACKGROUND OF THE INVENTION

Stone, masonry and various other substrates with surface porosity are used decoratively in the indoor and exterior environment. However, such surfaces are easily stained, for instance by oils, hydraulic fluids, and oily and aqueous foodstuffs, including oils, coffee, ketchup, salad dressings, mustard, red wine, other beverages, and fruit preserves. Many of the prior art treatments, such as clear sealants based on polyurethanes or epoxies, disadvantageously alter the appearance of the substrate. Such sealants can also trap moisture within the treated substrate, promoting spalling.

U.S. Pat. No. 4,957,948, of Terry and McIntosh describes biocidal protective coatings for heat exchangers which consist of an organic water-resistant polymer with an associated mixture of mono-alkyl and bis-alkyl phosphates. The heat exchanger coatings of Terry and McIntosh contain perfluoroalkyl methacrylate copolymers and up to 10% and preferably 1–5% by weight of an alkyl phosphoric acid or its derivative. The coatings are applied to heat exchanger coils, such as coils of aluminum or copper, to provide durable biocidal adherent coatings. In a related patent, U.S. Pat. No. 4,935,232, McIntosh describes microbiocidal phosphate additives which contain at least one free hydroxyl group. McIntosh notes in U.S. Pat. No. 4,935,232 that if all the hydroxyl groups of the microbiocidal phosphate are replaced by alkyl or other organic groups, the phosphate will no longer exhibit microbiocidal activity. There is no teaching of use of their compositions for stain resistance on hard porous surfaces.

It is desirable to improve the degree of stain resistance conferred on such substrates and also not promote spalling. The present invention provides such treatment for surfaces subject to staining.

SUMMARY OF THE INVENTION

This invention comprises a composition comprising a mixture of a fluoroalkyl phosphate and a fluoroacrylate polymer wherein the fluoroalkyl phosphate is of Formula 1A or 1B

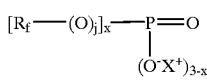

Formula 1A

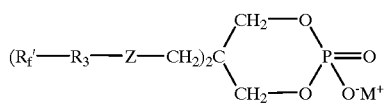

Formula 1B wherein:
$R_f$ is selected from the group consisting of
$F(CF_2CF_2)_d(CH_2)_a-$,
$F(CF_2CF_2)_dCH_2CH_2(OCH_2CH_2)_b-$,
$F(CF_2CF_2)_d-$,
$F(CF_2CF_2)_dCH=CH(CH_2)_c-$, and
$C_8F_{17}SO_2N(R)CH_2CH_2-$, $R_f'$ is a fluoroaliphatic group having a linear or branched perfluorocarbon chain having from 2 to 20 carbon atoms, x is from about 1 to about 2, j is 1 or 0, or a mixture thereof, d is 1 to about 8, or a mixture thereof, X is hydrogen or M, M is an ammonium ion, an alkali metal ion, or an alkanolammonium ion, $R_3$ is an alkylene group having from 1 to about 8 carbon atoms, Z is —O—, —S—, or —NH—, a is from about 2 to about 10, b is from about 3 to about 20, c is from about 2 to about 20, and R is H or an aliphatic group containing 1 to about 4 carbon atoms;

and the fluoroacrylate polymer has the five repeating units 1 to 5 as shown in Formula 2, said repeating units occurring in random distribution,

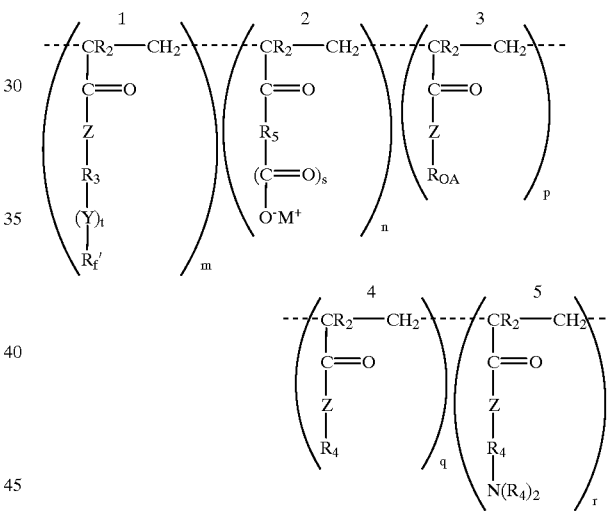

Formula 2 wherein:
each $R_2$ is independently hydrogen or an aliphatic group having from 1 to about 4 carbon atoms, each $R_3$ is independently an alkylene group having from 1 to about 8 carbon atoms, each R4 is independently an aliphatic group having from 1 to about 20 carbon atoms, each $R_5$ is independently a short chain alkylene group having from 1 to bout 4 carbon atoms, $R_f'$ is a fluoroaliphatic group having a linear or branched perfluorocarbon chain having from 2 to 20 carbon atoms, $R_{OA}$ is a group of the formula

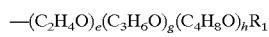

wherein $R_1$ is hydrogen or alkyl having 1 to about 4 carbon atoms, e is 0 to about 20, and g and h are each individually zero or a positive integer, provided that the value of (e+g+h) is equal to or greater than 1, each Z is independently —O—, —S—, or —NH—, Y is —N(R)SO$_2$— wherein R is H or an aliphatic group containing 1 to about 4 carbon atoms, M is an ammonium ion, an alkali metal ion or an alkanolammonium ion, s and t are each independently 0 or 1, and m, n, p, q, and r are each integers such that m and n are each independently at least 1 and p, q, and r are each independently zero or a positive integer.

This invention further comprises a method of improving stain resistance of substrate surfaces comprising application to the surface of a composition as described above, and a substrate having a surface to which such a composition has been applied.

DETAILED DESCRIPTION OF THE INVENTION

The present invention comprises new fluorinated aqueous compositions that, when applied to substrate surfaces, provide improved stain resistance, and the process for treating such substrates with the compositions of this invention. The present invention also comprises substrate surfaces treated with the stain resist compositions The term "substrate surfaces", as used herein, includes porous mineral surfaces. Specific examples of such substrates include unglazed concrete, brick, tile, stone, grout, mortar, composite materials such as terrazzo, gypsum board, statuary, monuments, wood, and leather. These are used in the construction of buildings, roads, parking ramps, driveways, floorings, fireplaces, fireplace hearths, counter tops, and other decorative uses in interior and exterior applications.

While not wishing to be bound by theory, it is believed that the mechanism for the generation of the advantageous properties of the composition of this invention is the simultaneous provision of a chemically bound surface oil- and water-repellent layer from the fluorophosphate component of the composition, and a deeper or penetrating oil and water repellent layer from the fluoroacrylate polymer component of the composition.

The composition of the present invention comprises a mixture of at least 11% by weight of a fluoroalkyl phosphate and not more than 89% by weight of a fluoroacrylate polymer. The fluorophosphate is a mixture of mono (perfluoroalkyl) phosphate and bis(perfluoroalkyl) phosphate of the structure of Formula 1A or a phosphate of the structure of Formula 1B. Formula 1A typically contains ranges of 20 mole % bis(perfluoroalkyl) phosphate and 80 mole % mono(perfluoroalkyl) phosphate to up to 85 mole % bis(perfluoroalkyl) phosphate and 15 mole % of mono (perfluoroalkyl) phosphate. Alternatively, Formula 1A is a mixture of perfluorinated phosophonic and phosphinic acids or their corresponding salts.

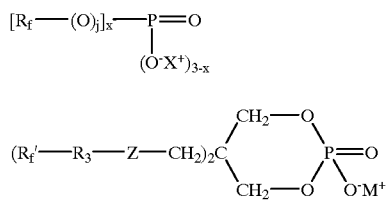

Formula 1A

Formula 1B wherein:

R$_f$ is selected from the group consisting of

F(CF$_2$CF$_2$)$_d$(CH$_2$)$_a$—,
F(CF$_2$CF$_2$)$_d$CH$_2$CH$_2$(OCH$_2$CH$_2$)$_b$—,
F(CF$_2$CF$_2$)$_d$—,
F(CF$_2$CF$_2$)$_d$CH=CH(CH$_2$)$_c$—, and
C$_8$F$_{17}$SO$_2$N(R)CH$_2$CH$_2$—, R$_f'$ is a fluoroaliphatic group having a linear or branched perfluorocarbon chain having from 2 to 20 carbon atoms, x is from about 1 to about 2, j is 1 or 0 or a mixture thereof, d is 1 to about 8, or a mixture thereof, and preferably is from about 3 to about 6, X is hydrogen or M, M is an ammonium ion, an alkali metal ion, or an alkanolammonium ion, such as ethanolammonium or diethanolammonium, and is preferably ammonium, R$_3$ is an alkylene group having from 1 to about 8 carbon atoms, and is preferably ethylene, Z is —O—, —S—, or —NH—, a is from about 2 to about 10, and preferably is 2, b is from about 3 to about 20, and preferably is from about 6 to about 13, c is from about 2 to about 20, and preferably is 8, and R is H or an aliphatic group containing 1 to about 4 carbon atoms.

The fluoroalkylphosphates are prepared according to the method described by Brace and Mackenzie, in U.S. Pat. No. 3,083,224. Typically, either phosphorus pentoxide (P$_2$O$_5$) or phosphorus oxychloride (POCl$_3$) are reacted with the fluoroalcohols to give mixtures of the mono- and bis (perfluoroalkyl)phosphoric acids. Neutralization, using common bases such as ammonium or sodium hydroxides provides the corresponding phosphates. Reacting an excess of fluoroalcohol with P$_2$O$_5$ followed by neutralization provides an equimolar mixture of mono(perfluoroalkyl) phosphate and bis(perfluoroalkyl)phosphate. Higher ratios of bis(perfluoroalkyl)phosphate to mono(perfluoroalyl) phosphate are obtained by using the method of Hayashi and Kawakami in U.S. Pat. No. 4,145,382.

The salts of the fluoroalkylphosphates are preferred over the corresponding acids as outlined in U.S. Pat. No. 3,083, 224 by reason of their increased water solubility. Examples of preparations of the fluorophosphates are given in U.S. Pat. No. 3,094,547.

The fluoroacrylate polymer component of the composition of this invention is a water-soluble aqueous fluoropolymer comprising polymers having interpolymerized units derived from monomers in Monomer Groups 1 and 2 and optionally monomers in Monomer Groups 3, 4, and 5 as described below. Monomer Group 1 comprises acrylates or alkylacrylates containing a pendant fluoroalkyl group, or mixtures thereof. Examples of Group 1 monomers are:

F(CF$_2$)$_8$CH$_2$CH$_2$OC(O)CH=CH$_2$,
F(CF$_2$)$_8$CH$_2$CH$_2$OC(O)C(CH$_3$)=CH$_2$,
F(CF$_2$)$_{10}$CH$_2$CH$_2$OC(O)CH=CH$_2$,
F(CF$_2$)$_{10}$CH$_2$CH$_2$OC(O)C(CH$_3$)=CH$_2$,
F(CF$_2$)$_{12}$CH$_2$CH$_2$OC(O)CH=CH$_2$,
F(CF$_2$)$_{12}$CH$_2$CH$_2$OC(O)C(CH$_3$)=CH$_2$,
C$_8$F$_{17}$SO$_2$N(C$_2$H$_5$)CH$_2$CH$_2$OC(O)CH=CH$_2$,
C$_8$F$_{17}$SO$_2$N(C$_2$H$_5$)CH$_2$CH$_2$OC(O)C(CH$_3$)=CH$_2$,
C$_8$F$_{17}$SO$_2$N(C$_4$H$_9$)CH$_2$CH$_2$OC(O)CH=CH$_2$, and
C$_8$F$_{17}$SO$_2$N(C$_4$H$_9$)CH$_2$CH$_2$OC(O)C(CH$_3$)=CH$_2$ Alternatively, fluorinated or perfluorinated polyethers may be used as depicted in Formula 2 below.

Monomer Group 2 comprises acrylic and alkylacrylic acids or mixtures thereof.

Optional Monomer Group 3 comprises monomers from the group consisting of acrylate, methacrylate, acrylamide, methacrylamide, thioacrylate, or meththioacrylate compounds that contain an oxyalkylene or polyoxyalkylene group, or mixtures thereof.

The oxyalkylene or polyoxyalkylene monomer of Monomer group 3, shown as $R_{OA}$ in Formula 2 below, is a group of the formula

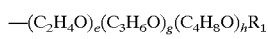

wherein $R_1$ is hydrogen or alkyl having 1 to about 4 carbon atoms, e is 0 to about 20, and g and h are each individually zero or a positive integer, provided that the value of (e+g+h) is equal to or greater than 1, and preferably is equal to or greater than 1 to 20, to ensure the polymeric product is water-soluble or water-dispersible. Preferably, $R_{OA}$ contains a polyoxyethylene chain or a polyoxyalkylene chain consisting of interpolymerized oxyethylene and oxypropylene units.

Examples of Group 3 monomers are:

$HOCH_2CH_2OC(O)CH=CH_2$, having e=1 and g=h=0;

$HO(CH_2CH_2O)_7C(O)C(CH_3)=CH_2$, having e=7 and g 32 h=0;

$HO(C_3H_6O)_7C(O)C(CH_3)=CH_2$, having e=h=0 and g=7; and $CH_3O(CH_2CH_2O)_{14}C(O)C(CH_3)=CH_2$ having e=14 and g=h=0.

Optional Monomer Group 4 comprises alkyl acrylates, and N-alkylacrylamides, or a mixture thereof. Examples of Group 4 monomers are:

$CH_3OC(O)CH=CH_2$, $CH_3OC(O)C(CH_3)=CH_2$, $C_2H_5OC(O)CH=CH_2$, $C_4H_9OC(O)CH=CH_2$, and $C_4H_9OC(O)C(CH_3)=CH_2$.

Optional Monomer Group 5 comprises a dialkylaminoalkyl acrylate, such as 2-diethylaminoethyl methacrylate.

The fluoroacrylate has the structure of Formula 2 below, wherein the numbers 1 to 5 at the top designate the monomer described above. Formula 2 is schematic and the actual fluoropolymer can have a substantially random distribution of the monomers or can have a block copolymer structure Formula 2

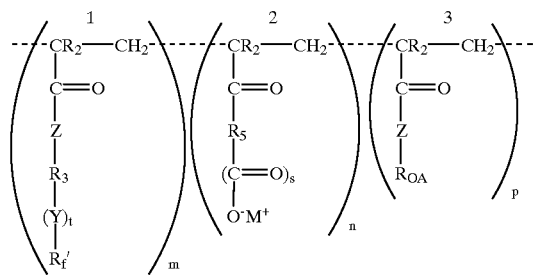

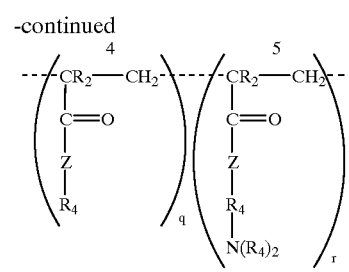

wherein:
each $R_2$ is independently hydrogen or an aliphatic group having from 1 to about 4 carbon atoms, and is preferably H or methyl, each $R_3$ is independently an alkylene group having from 1 to about 8 carbon atoms, and is preferably ethylene, each $R_4$ is independently an aliphatic group having from 1 to about 20 carbon atoms, and is preferably 1 to 4 carbon atoms, each $R_5$ is independently a short chain alkylene group having from 1 to about 4 carbon atoms, and is preferably methylene or ethylene, $R_f'$ is a fluoroaliphatic group having a linear or branched perfluorocarbon chain having from 2 to 20 carbon atoms, $R_{OA}$ is a group of the formula

wherein $R_1$ is hydrogen or alkyl having 1 to about 4 carbon atoms, e is 0 to about 20, and g and h are each individually zero or a positive integer, provided that the value of (e+g+h) is equal to or greater than 1, and preferably is equal to or greater than 1 to 20, each Z is independently —O—, —S—, or —NH—, Y is —N(R)SO$_2$— wherein R is as described above for Formula 1, M is as defined above in Formula 1, s and t are each independently 0 or 1, m, n, p, q, and r are each integers such that m and n are each independently at least 1, and p, q, and r are each independently zero or a positive integer. Preferably the ratio of m:n is from 1:2 to 1:6, the ratio of m:p is 1:0.5 to 1:0, the ratio of m:q is 1:1 to 1:0, and the ratio of m:r is 1:0.1 to 1:0.

The number average molecular weight of the polymer is between 1,000 and 50,000. The polymers were prepared by standard polymerization techniques. Monomers are typically dissolved in an organic solvent such as 4-methyl-2-pentanone or in a mixture of organic solvents containing little or no water. Polymerization is initiated using 0.5 to 2% by weight of a standard free-radical initiator such as t-butylperoctoate, t-amyl peroxy 2-ethylhexanoate or 2,2-azobisisobutyronitrile. Optionally 0.1 to 1% by weight of a standard chain transfer agent such as dodecylmercaptan may also be used. The use of a chain transfer agent in a solvent, such as tetrahydroftiran or cumene, which itself provides chain transfer properties, can also be used Polydispersities are usually between the range of 1.1 and 3.0. After the polymerization is complete, the acidic polymer solution is neutralized using a basic water solution to form an emulsion. Typically ammonium hydroxide is used. The amount of base necessary is calculated by assuming complete salt formation of all acid functionalities. Optionally 0–5% mole percent excess of base is added to insure conversion of all acid to salt. The final pH of the emulsion is between about 6 and about 9, and preferably is between 6 and 8. The bases suitable for the neutralization are alkali metal hydroxides, alkali metal carbonates, ammonium hydroxide or ethanolamines. Ammonium hydroxide solution is preferred.

An aqueous solution of the composition of this invention is used for coating substrate surfaces. The concentration of the aqueous solution used for coating substrate surfaces is conveniently measured in terms of the total fluorine content of the aqueous solution, and the fluorine contributions to the total fluorine content provided by the fluorophosphate and fluoroacrylate polymer components. The fluorine content of each component is determined by analysis or calculation, as appropriate. The total fluorine content of the aqueous treating solution is typically 0.2 to about 1.5%, and preferably 0.7–1.0%, for the preferred wet-on-wet coating procedure (described below). While the lower concentrations provide economy, the level of stain resistance provided is reduced. Higher concentrations increase cost and provide little or no additional protection. The amount of fluorophosphate should provide from about 20 to about 95%, and preferably 25–85%, of the fluorine content, and the remaining fluorine content is provided by the fluoropolymer. Coatings outside these ranges provide reduced protection.

The aqueous fluoropolymer solutions alone provide some protection to the stone and masonry substrate although the protection is reduced compared to the mixtures described above. Although the fluoropolymer coating does adhere to the stone and masonry substrates used in the following examples, it does not stick to metals used in heat exchanger coils described by Terry and McIntosh in U.S. Pat. No. 4,597,948.

The present invention further comprises a method of improving stain resistance of substrate surfaces comprising application of the composition described above. The composition of the present invention, at the application concentration and composition described above, is applied to the substrate surface by conventional means, including but not limited to, brush, spray, roller, doctor blade, wipe, and dip techniques, preferably using a two-coat wet-on-wet technique. The wet-on-wet procedure comprises applying a first coat which is allowed to soak into the substrate but not dry (e.g., for about 10–30 minutes) and then applying a second coat. The substrate is then allowed to dry under ambient conditions in the field, or the drying can be accelerated by warm air if desired. The wet-on-wet application procedure provides a means to distribute or build up more of the protective coating at the substrate surface. Single coat application techniques, while not preferred, can also be used. In such single coat applications, the total fluorine concentration in the aqueous coating can be increased up to twice while maintaining the relative fluorine contributions of the fluorophosphate and fluoropolymer components The application concentration is prepared directly from the fluorophosphate and fluoropolymer or by diluting a premix concentrate. Premix concentrates comprise a more concentrated aqueous solution or suspension of the fluorophosphate and fluoropolymer in the same ratio as described above. When diluted prior to application, the total fluorine content and the contributions of the fluorophosphate and fluoropolymer to the total fluorine content are as described above for the coating composition. Such concentrated premixes are more convenient and economical to transport and store, and are diluted with water to the application composition prior to use.

The present invention further comprises substrates treated according to the method of the present invention. These substrates comprise porous hard surfaced materials used in interior and exterior construction applications. Examples of such materials include concrete, brick, tile, stone, grout, mortar, terrazzo, gypsum board, statuary, wood and leather. The treated substrates have improved resistance to a variety of stains including foods, oils, and acid dye stains.

The compositions, method, and treated substrates of the present invention are useful in providing resistance to staining for a variety of hard surfaces used for interior and exterior construction and decorative purposes. Substrates having surface porosity are especially subject to staining and often difficult to protect without altering the appearance of the surface. The present invention provides protection while permitting retention of the normal appearance of the surface.

TEST METHODS

Test Method 1. Determination of Stain Resistance on Masonry

This test method describes the procedure for testing the stain resistance of stone treatments. Square tiles (12 in., or 30.5 cm, square) of three sample substrates, sandstone, limestone, and saltillo or "Mexican clay" tile, were cut into 4 in, or 10.2 cm, square samples. After cutting, the stone samples were rinsed to remove any dust or dirt and allowed to dry thoroughly, typically 3 days or more.

Treating solutions were made by diluting the product candidates in water to the desired treating concentration. The top surfaces of the tiles were treated by dipping them into the treating solution for 10 seconds. The treated tiles were then allowed to dry overnight. Dipping was chosen as the method of application to achieve a more uniform treatment on the absorbent surface than is typically achieved by brushing or wiping. Test results can be sensitive to non-uniform application.

The following food stains were placed at intervals on the treated and dried tile surface and allowed to remain on the tile for 24 hours: 1) Corn Oil, 2) Ketchup, 3) Italian salad dressing, 4) Mustard, 5) Red wine, 6) Hot coffee (black), and 7) Grape jelly.

After the 24-hour period, the food stains were blotted or lightly scraped from the tile surface. A mild surfactant solution such as 1% DAWN dishwashing liquid (Proctor & Gamble, Cincinnati Ohio.) in water, is then applied to the tile surface and a stiff bristle brush is used to scrub the surface 10 cycles back and forth. The tiles were then rinsed with water and allowed to dry before rating.

The stains remaining on the tile surfaces after cleaning were rated visually as follows:

| Rating No. | Stain Intensity |
| --- | --- |
| 0 | No stain |
| 1 | Very light stain |
| 2 | Light stain |
| 3 | Moderate stain |
| 4 | Heavy stain |

The ratings for each stone (limestone, sandstone and saltillo) sample were summed for eachof the stains to give a composite rating for that stone.

Thus the maximum or the score was 7 stains times the maximum score of 4=28. Lower scores indicated better stain protection with zero indicating the best protection with no stain present.

Test Method 2. Coating Adhesion Tests on Metals

Various mixtures of fluoropolymer emulsions and fluorophosphate solution were coated on the indicated metals using a 3-mil (0.08 mm) doctor blade allowed to dry cross-hatched, and tested for adhesion before and after boiling in the waters for 10 minutes according to the American Society for Testing Materials ASTM D3359. dhesion was rated as follows:

| Rating No. | Adhesive Intensity |
| --- | --- |
| 1 | no coating removed |
| 2 | about 25% of coating removed |
| 3 | about 50% coating removed |
| 4 | about 75% coating removed |
| 5 | all of the coating removed |

EXAMPLES

All polymerization reactions were run under an inert gas unless otherwise noted.

Example 1

(a) Polymer P1 Preparation

A 250-ml round bottom flask equipped with a stirrer, condenser, and thermocouple was dried and purged with inert gas. To the flask was added 31.63 g of ZONYL TA-N, mixed perfluoroalkylethylacrylates of formula $F(CF_2CF_2)_{3-8}CH_2CH_2OC(O)CH=CH_2$ available from E. I. du Pont de Nemours and Company, Wilmington, Del.; 1.22 g of butyl acrylate, and 4.52 g of acrylic acid each available from Sigma-Aldrich, Milwaukee, Wis.; in 80.1 g of tetrahydrofuran also available from Sigma-Aldrich, Milwaukee, Wis. This mixture was heated to 50° C. and then 0.79 g of t-butylperoctoate initiator available from Elf Atochem North America, Philadelphia, Pa., was added, and the reaction temperature was raised to 65° C. and stirred for 20 hours.

After cooling, the contents of the reaction flask were transferred to a 500-ml flask, equipped with a distillation head, and which contained 3.9 g of 28% ammonium hydroxide available from J. T. Baker, Phillipsburg, N.J. in 150 g of distilled water. This mixture was stirred and heated, then tetrahydrofuran was distilled off leaving a cloudy emulsion. An additional 130 g of distilled water was added producing an emulsion containing 9.1% solids with 5.6% fluorine by weight.

(b) Preparation of the Aqueous Coating Solution and Application to Substrates

A coating solution was prepared by mixing 7.0 g of the aqueous dispersion of the fluoropolymer of Example 1 (a) with 2.4 g of ZONYL 9027, mixed salts of formula $[F(CF_2CF_2)_{3-8}CH_2CH_2O]_xPO[O^-NH_2(CH_2CH_2OH)_2^+]_y$ wherein x+y is 3 and x is 1 or 2, available from E. I. du Pont de Nemours and Company, Wilmington, Del, and 90.6 g of deionized water. The percent fluorine from the phosphate compnent was 50%. The coating solution contained 1.5% solids and 0.84% fluorine by weight. The diluted solution was applied to the sandstone, limestone, and saltillo substrates as described in Test Method 1 using conventional techniques, such as by spraying, brushing, dipping, and flood coating. The substrate samples were (a) stained and tested according to Test Method 1. The test results are shown in Table 2 and Table 3.

Example 2

A coating solution was prepared by mixing the polymer of Example 1(a) with ZONYL 9027 and deionized water to prepare a coating solution as in Example 1. ZONYL 9027 is a fluorophosphate of mixed salts of formula $[F(CF_2CF_2)_{3-8}CH_2CH_2O]_xPO[O^-NH_2(CH_2CH_2OH)_2^+]_y$ wherein x+y is 3 and x is 1 or 2, available from E. I. du Pont de Nemours and Company, Wilmington, Del. The percent fluorine from the phosphate component was 75%. The coating solution was diluted to a constant fluorine concentration of 0.84% fluorine by weight. The diluted solution was applied to sandstone, limestone, and saltillo substrates as described in Test Method 1. The substrates were stained and tested according to Test Method 1, and the results are shown in Tables 2 and 3.

Example 3

(a) Preparation of Bis-phosphate Q2(b)

A 500 ml round-bottom flask equipped with a stirrer, thermocouple, condenser, and addition funnel was dried and purged with argon. The flask was charged with 123.6 g (0.279 mol.) of ZONYL BA-L alcohol dissolved in 50 ml of toluene and heated to 60° C. ZONYL BA-L is a mixture of alcohols of formula $F(CF_2CF_2)_{2-8}CH_2CH_2OH$ available from E. I. du Pont de Nemours and Company, Wilmington, Del. Phosphorus oxychloride (24.3 g, 0.159 mol.) was slowly added over a period of 10 minutes. The temperature was slowly raised at 115° C. over a period of an hour while HCl gas was evolved and purged out of the system. The temperature was maintained at 115° C., and the reaction mixture was sampled periodically and analyzed by gas chromatography for unreacted ZONYL BA-L alcohol. After 5.5 hours, the reaction mixture was cooled to 90° C. and 3.54 g of distilled water was added with concurrent HCl evolution. The mixture was stirred at 90° C. for an additional hour, cooled to 75° C. and the toluene was then distilled from the reaction mixture under reduced pressure leaving a brown residue. The temperature was reduced to 56° C. and 83.97 g of 2-propan was added followed by a solution containing 19.59 g of concentrated ammonium hydroxide (28%) in 117.0 g of distilled water. The resulting brown solution was heated at 65° C. for an additional two hours and cooled yielding 345.2 g of product at 34.63% solids. 31P NMR analysis showed the solution contained a mixture of 15.7% $(F(CF_2)_nCH_2CH_2O)P(O)(O^-NH_4^+)_2$, 49.8% $(F(CF_2)_nCH_2CH_2O)_2P(O)(O^-NH_4^+)$, 12.8% $(F(CF_2)_nCH_2CH_2O)_3P=O$.

This phosphate mixture was designated as Q2(b).

(b) Preparation of Aqueous Coating Solution and Application to Substrates

The polymer of Example 1 (a) was combined with the bis-phosphate of section (a) of this example, and with deionized water to prepare a coating solution as in Example 2 having the percent fluorine from the bis-phosphate component of 75%. The coating solution was diluted to a constant fluorine concentration of 0.84% fluorine by weight. The diluted coating solution was applied to sandstone, limestone, and saltillo substrates described in Test Method 1. The substrates were stained and tested according to Test Method 1, and the results are shown in Tables 2 and 3.

Examples 4–10

The fluoroacrylate polymer emulsions listed in Table 1 and designated as P2 and P3 were made according to the procedure described in Example 1. The weight percent solids of the final emulsions ranged from 9% to 20%. The fluoroacrylate polymers and fluorophosphates were as defined in Table 1. The polymer was combined with the fluorophosphates as listed in Table 2 and diluted to prepare the coating solutions. The coating solutions listed in Table 2 were prepared as described in Example 1 and, in each case, the final coating solution, containing a polymer and fluorophosphate was diluted with deionized water to a final coating solution concentration of 0.84% fluorine by weight. The coating solutions were applied to the substrates and tested as described in Test Method 1. The results of the stain resistance testing are shown in Table 2 and Table 3.

Example 11

(a) Preparation of Bis-phosphate Q2(a)

A 500 ml round-bottom flask equipped with a stirrer, thermocouple, condenser, and addition funnel was dried and purged with argon. The flask was charged with 123.6 g (0.279 mol.) of ZONYL BA-L. ZONYL BA-L is a mixture of alcohols of formula $F(CF_2CF_2)_{2-8}CH_2CH_2OH$ available from E. I. du Pont de Nemours and Company, Wilmington, Del. The flask was heated to 115° C. and 23.0 g (0.15 mol.) phosphorus oxychloride slowly added over a period of 10 minutes. The temperature was maintained at 11 5° C., and the reaction mixture was sampled periodically and analyzed by gas chromatography for unreacted ZONYL BA-L alcohol. After 6 hours at 115 ° C., the reaction mixture was diluted with 2-propanol (84.0 g) and neutralized with ammonium hydroxide (19.7 g, 30%). Distilled water (3.54 g) was added, and the reaction mass was heated at 45° C. for 1 hour. The product was isolated as a brown liquid at 35.3% solids. 31P NMR analysis showed the solution contained a mixture of 7.4% $(F(CF_2)_nCH_2CH_2O)P(O)$ $(O\_NH_4^+)_2$, 63.4% $(F(CF_2)_nCH_2CH_2O)_2P(O)$ $(O^-NH_4^+)$, 3.1% $(F(CF_2)_nCH_2CH_2O)_3P=O$.

This phosphate mixture was designated as Q2(a).

(b) Preparation of Aqueous Coating Solution and Application to Substrates

The polymer of Example 3 was combined with the bis-phosphate of section (a) of this example, and with deionized water to prepare a coating solution as in Example 2 having the percent fluorine from the bis-phosphate component of 85%. The coating solution was diluted to a constant fluorine concentration of 0.84% fluorine by weight. The diluted coating solution was applied to sandstone, imestone, and saltillo substrates described in Test Method 1. The substrates were stained and tested according to Test Method 1, and the results are shown in Tables 2 and 3.

Examples 12–17

The fluoroacrylate polymer emulsions listed in Table 1 and designated P3 through P7 were prepared according to the procedure of Example 2. The weight percent solids ranged from 9% to 20%. The fluoroacrylate polymers and fluoroacrylate polymers and fluorophosphates were as defined in Table 1. The polymer was combined with the fluorophosphates as listed in Table 2 and diluted to prepare the coating solutions. The coating solutions listed in Table 2 were prepared as in Example 1 and, in each one, the final coating solution, containing a polymer and fluorophosphate was diluted with deionized water to a final coating solution concentration of 0.84% fluorine by weight. The coating solutions were applied to the substrate and tested as described in Test Method 1. The results of the stain resistance testing are shown in Table 2 and Table 3.

Comparative Examples A–G

Comparative Examples A–G contained no fluorophosphates in the coating solution. The polymers listed in Table 1 were diluted with deionized water to a final coating solution concentration of 0.84% fluorine by weight, with all of the fluorine coming from the polymer. The coating solutions were applied to the substrates and tested as described in Test Method 1. The results of the stain resistance testing are shown in Table 2 and Table 3.

Comparative Examples H–M

Comparative Examples H–M contained no fluoroacrylate polymer in the coating solution. The fluoroalkyl phosphates described in Table 1 and designated Q1–Q5 were diluted with deionized water to a final coating solution concentration of 0.84% fluorine by weight, with all of the fluorine coming from the fluorophosphate. The coating solutions were applied to the substrates and tested as described in Test Method 1 The results of the stain resistance testing are shown in Table 2 and Table 3.

TABLE 1

Identification of Fluoropolymers and Fluorophosphates

| Fluoro-Polymer | Monomer Composition | Monomer Mole Ratio |
|---|---|---|
| P1 | ZONYL TA-N*/ammonium acrylate/butyl acrylate | 35/40/6 |
| P2 | ZONYL TA-N*/ammonium acrylate/butyl acrylate | 35/60/5 |
| P3 | ZONYL TA-N*/ammonium acrylate/ $CH_2=C(CH_3)C(O)O(CH_2CH_2O)_7H$ | 37/17/46 |
| P4 | ZONYL TA-N*/ammonium acrylate | 23/77 |
| P5 | ZONYL TM**/ammonium acrylate | 28/72 |
| P6 | ZONYL TM**/ammonium acrylate/ 2-diethylaminoethyl methacrylate | 27/72/1 |
| P7 | ZONYL TM**/ammonium acrylate/ 2-diethylaminoethyl methacrylate | 22/74/4 |

| Fluoro-phosphate | Description | |
|---|---|---|
| Q1 | ZONYL 9027, a mixed salts of the formula $(F(CF_2CF_2)_{3-8}CH_2CH_2O)_xPO[O^-NH_2(CH_2CH_2OH)_2^+]y$ having x + y = 3 and x = 1 or 2, obtained from E. I. du | |

TABLE 1-continued

Identification of Fluoropolymers and Fluorophosphates

|  |  | Monomer Mole Ratio |
|---|---|---|
|  | Pont de Nemours and Company, Wilmington, DE |  |
| Q2(a) | Bis-phosphate of Example 11 |  |
| Q2(b) | Bis-phosphate of Example 3 |  |
| Q3 | Scotchban FC-807A, a fluoroalkyl phosphate containing approximately 85% $(C_8F_{17}SO_2N(CH_2CH_3)CH_2CH_2O)_2P(O)O^-NH_4^+$ and 15% $C_8F_{17}SO_2N(CH_2CH_3)CH_2CH_2OP(O)(O^-NH_4^+)_2$, at 20% active ingredient concentration, obtained from 3M Company, St. Paul, MN. |  |
| Q4 | Lodyne P-208E, a fluoroalkyl phosphate containing $(F(CF_2CF_2)_4CH_2CH_2SCH_2)_2C(CH_2O^-)_2P(O)O^-NH_4+$ at 24% active ingredient concentration, was obtained from Ciba Specialty Chemicals, Basel, Switzerland. |  |
| Q5 | Fluowet PL-80-B contains a mixture of perfluorinated phosphinic and phosphonic acids and was obtained from Clariant Muttenz, Switzerland. |  |

*ZONYL TA-N is a mixed perfluoroalkylethylacrylates of the formula $F(CF_2CF_2)_{3-8}CH_2CH_2OC(O)CH=CH_2$ available from E. I. duPont de Nemours and Company, Wilmington, DE
**ZONYL TM is a mixed perfluoroalkylethylacrylates of the formula $(F(CF_2CF_2)_{3-8}CH_2CH_2OC(O)CH_3=CH_2)$ available from E. I. duPont de Nemours and Company, Wilmington, DE

TABLE 2

Coating Solution Compositions* and Stain Ratings

| Ex # | Fluoro-acrylate Polymer | Fluoro-Phosphate | % F from Phosphate | Sand-stone | Lime-Stone | Saltillo |
|---|---|---|---|---|---|---|
| Control | None | None | None | 25 | 21 | 24 |
| 1 | P1 | Q1 | 50% | 11 | 6 | 14 |
| 2 | P1 | Q1 | 75% | 8 | 5 | 14 |
| 3 | P1 | Q2(b) | 75% | 26 | 6 | 8 |
| 4 | P1 | Q3 | 75% | 17 | 10 | 14 |
| 5 | P2 | Q1 | 75% | 3 | 3 | 18 |
| 6 | P2 | Q2(b) | 75% | 18 | 6 | 6 |
| 7 | P2 | Q2(b) | 85% | 17 | 5 | 15 |
| 8 | P2 | Q4 | 25% | 28 | 12 | 13 |
| 9 | P2 | Q5 | 25% | 22 | 15 | 8 |
| 10 | P3 | Q1 | 75% | 9 | 8 | 3 |
| 11 | P3 | Q2(a) | 75% | 12 | 8 | 1 |
| 12 | P3 | Q2(a) | 50% | 14 | 14 | 11 |
| 13 | P3 | Q2(a) | 25% | 13 | 13 | 17 |
| 14 | P4 | Q1 | 75% | 6 | 7 | 6 |
| 15 | P5 | Q1 | 25% | 6 | 5 | 5 |
| 16 | P6 | Q1 | 25% | 8 | 7 | 4 |
| 17 | P7 | Q1 | 75% | 10 | 6 | 17 |
| Comparative Examples: |  |  |  |  |  |  |
| A | P1 | NONE | 0% | 22 | 19 | 24 |
| B | P2 | NONE | 0% | 20 | 18 | 26 |
| C | P3 | NONE | 0% | 16 | 16 | 21 |
| D | P4 | NONE | 0% | 11 | 8 | 23 |
| E | P5 | NONE | 0% | 14 | 13 | 18 |
| F | P6 | NONE | 0% | 19 | 11 | 11 |
| G | P7 | NONE | 0% | 18 | 12 | 17 |
| H | NONE | Q1 | 100% | 19 | 10 | 6 |
| I | NONE | Q2(a) | 100% | 24 | 7 | 17 |
| J | NONE | Q2(b) | 100% | 16 | 5 | 19 |
| K | NONE | Q3 | 100% | 26 | 12 | 14 |
| L | NONE | Q4 | 100% | 26 | 23 | 13 |
| M | NONE | Q5 | 100% | 28 | 22 | 19 |

*Fluoroacrylate compositions P1–P7 and Fluorophosphate compositions Q1–Q5 are shown in Table 1

Table 2 lists the composite stain ratings for each treating solution on each sample substrate (sandstone, limestone, and saltillo) All of the treating solutions used contained the same total concentration of fluorine in solution, so the stain results for the fluoroacrylate/fluorophosphate blends can be compared to the results for the fluoroacrylates alone (Comparative Examples A–G) and for the fluorophosphates alone (Comparative Examples H–M). Lower scores represent better stain resistance. Each score represents the sum of scores for the seven stains described in Test Method 1.

Table 3 lists the results of comparing each fluoroacrylate/fluorophosphate blend in Examples 1–17 with the component fluoroacrylate from Comparative Examples A–G and fluorophosphate from Comparative Examples H–M. Table 3 shows for each substrate the quantity:

(The rating for the tile treated with the Comparative Example MINUS the rating for the tile treated with the Example tile rating.)

Similarly, each fluoroacrylate/fluorophosphate blend in Examples 1–17 is compared with the control (untreated substrate), and the last three columns of Table 3 show the quantity:

(The rating for the untreated or control tile MINUS the rating for the tile treated with the Example tile rating.)

The calculation uses the sum of the scores for the seven stains as shown in Table 2 and as described in Test Method 1. Thus the first entry (in line 1, column 3), shows Example 1 versus Comparative Example A. Using the values from Table 2, the calculation is:

[22 (rating for A on sandstone)−11 (rating for Example 1 on sandstone)]=11

TABLE 3

Stain Rating Comparisons

| | Examples vs. Comparative Examples A–G | | | | Examples vs. Comparative Example A–G | | | | Example vs. Untreated Stone or Tile (Control) | | |
|---|---|---|---|---|---|---|---|---|---|---|---|
| | Vs. | Substrate | | | Vs. | Substrate | | | Substrate | | |
| Ex # | Comp. Ex. # | Sand-stone | Lime-stone | Salt-illo | Comp. Ex. # | Sand-stone | Lime-stone | Salt-illo | Sand-stone | Lime-stone | Salt-illo |
| 1 | A | 11 | 13 | 10 | H | 8 | 4 | * | 14 | 15 | 10 |
| 2 | A | 14 | 14 | 10 | H | 11 | 5 | * | 17 | 16 | 10 |
| 3 | A | * | 13 | 16 | J | * | * | 11 | * | 15 | 16 |
| 4 | A | 5 | 9 | 10 | K | 9 | 2 | * | 8 | 11 | 10 |
| 5 | B | | 15 | 8 | H | 16 | 7 | * | 22 | 18 | 6 |
| 6 | B | 2 | 12 | 20 | J | * | * | 13 | 7 | 15 | 18 |
| 7 | B | 3 | 13 | 11 | J | * | * | 4 | 8 | 16 | 9 |
| 8 | B | * | 6 | 13 | L | * | 11 | * | * | 9 | 11 |
| 9 | B | * | 3 | 8 | 18 | M | 6 | 7 | 11 | 6 | 16 |
| 10 | C | 7 | 8 | 18 | H | 10 | 2 | 3 | 16 | 13 | 21 |
| 11 | C | 4 | 8 | 20 | I | 12 | * | 16 | 13 | 13 | 23 |
| 12 | C | 2 | 2 | 10 | I | 10 | * | 6 | 11 | 7 | 13 |
| 13 | C | 3 | 3 | 4 | H | 11 | * | * | 12 | 8 | 7 |
| 14 | D | 5 | 1 | 17 | H | 13 | 3 | * | 19 | 14 | 18 |
| 15 | E | 8 | 8 | 13 | H | 13 | 5 | 1 | 19 | 16 | 19 |
| 16 | F | 11 | 4 | 7 | H | 11 | 3 | 2 | 17 | 14 | 20 |
| 17 | G | 8 | 6 | * | H | 9 | 4 | * | 15 | 15 | 7 |

*No visual improvement.

Table 3 shows the fluoroacrylate/fluorophosphate blends in Examples 1–17 usually demonstrated better stain resistance (i.e. lower stain ratings) than the fluoropolymers used alone (Comparative Examples A–G, columns 2–5), the fluorophosphates used alone (Comparative Examples H–M, columns 6–9), or Control tests on untreated substrates (columns 10–12). For example, the blend of fluoroacrylate P1 and flurophosphate Q1 in Example 1 had better stain resistance (lower stain ratings) on all three substrates than P1 used alone (Comparative Example A), and better stain resistance on two of the three substrates than Q1 used (Comparative Example H). The data also showed that the stain resistance achieved on any given substrate was impacted by the choice of fluroacrylate and fluorophosphate and the blend ratio of these two components.

Example 18

The fluoroacrylate polymer emulsions listed in Table 1 and designated P1, P3, P5 and P6 were tested in accordance with Test Method 2. Fluoropolymer P5 was used at a concentration of 15% solids in water, fluoropolymers P1 and P3 were used at 18% and 9% solids respectively. The results are shown in Table 4.

TABLE 4

Adhesion Testing Results

| | Metalic Substrate | | |
|---|---|---|---|
| Coating/Treatment | Aluminum | Copper | Stainless Steel |
| P1 before boiling | 4 | 1–2 | 1–2 |
| P1 after boiling | 4 | 4 | 4 |
| P3 before boiling | 4 | 1–2 | 1–2 |
| P5 before boiling | 2–3 | 1–2 | 1–2 |
| P5 after boiling | 5 | 2–3 | 5 |
| P6 before boiling | 2–3 | 1–2 | 1–2 |
| P6 after boiling | 5 | 2–3 | 5 |

TABLE 4-continued

Adhesion Testing Results

| | Metalic Substrate | | |
|---|---|---|---|
| Coating/Treatment | Aluminum | Copper | Stainless Steel |
| Blend of 85% P1 + 15% phosphate Q2(b) after boiling | 4 | 4 | 4 |
| Blend of 85% P1 + 15% phosphate Q2(b) before boiling | 1–2 | 1–2 | 1–2 |

The results in Table 4 indicated in all cases at least some of the polymer was removed before boiling. After boiling under the conditions of ASTM D3359, at least 75% of the coating was removed with tape indicating that the polymer and mixtures of the polymer and phosphate did not adhere to the metals tested.

What is claimed is:

1. A composition comprising a mixture of a fluoroalkyl phosphate and a fluoroacrylate polymer wherein the fluoroalkyl phosphate is of Formula 1A or 1B

Formula 1A

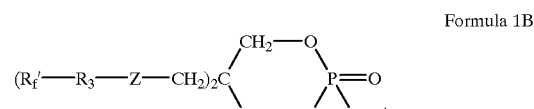

Formula 1B wherein:
$R_f$ is selected from the group consisting of
$F(CF_2CF_2)_d(CH_2)_a-$,
$F(CF_2CF_2)_dCH_2CH_2(OCH_2CH_2)_b-$,
$F(CF_2CF_2)_d-$,
$F(CF_2CF_2)_dCH=CH(CH_2)_c-$, and $C_8F_{17}SO_2N(R)CH_2CH_2$—, $R_f'$ is a fluoroaliphatic group having a linear or branched perfluorocarbon chain having from 2 to 20 carbon atoms, x is from about 1 to about 2, j is 1 or 0 or a mixture thereof, d is 1 to about 8, or a mixture thereof, X is hydrogen or M, M is an ammonium ion, an alkali metal ion, or an alkanolammonium ion, $R_3$ is an alkylene group having from 1 to about 8 carbon atoms, Z is —O—, —S—, or —NH—, a is from about 2 to about 10, b is from about 3 to about 20, c is from about 2 to about 20, and R is H or an aliphatic group containing 1 to about 4 carbon atoms;

and the fluoroacrylate polymer has the five repeating units 1 to 5 as shown in Formula 2, said repeating units occurring in random distribution, Formula 2

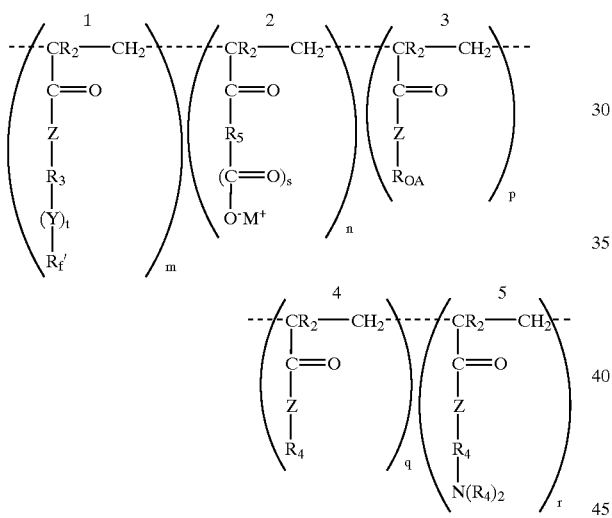

wherein:

each $R_2$ is independently hydrogen or an aliphatic group having from 1 to about 4 carbon atoms, each $R_3$ is independently an alkylene group having from 1 to about 8 carbon atoms, each $R_4$ is independently an aliphatic group having from 1 to about 20 carbon atoms, each $R_5$ is independently a short chain alkylene group having from 1 to about 4 carbon atoms, $R_f'$ is a fluoroaliphatic group having a linear or branched perfluorocarbon chain having from 2 to 20 carbon atoms, $R_{OA}$ is a group of the formula

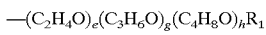

wherein $R_1$ is hydrogen or alkyl having 1 to about 4 carbon atoms, e is 0 to about 20, and g and h are each individually zero or a positive integer, provided that the value of (e+g+h) is equal to or greater than 1, each Z is independently —O—, —S—, or —NH—, Y is —N(R)SO$_2$— wherein R is H or an aliphatic group containing 1 to about 4 carbon atoms, M is an ainmonium ion, an alkali metal ion, or an alkanolammonium ion, s and t are each independently 0 or 1, and m, n, p, q, and r are each integers such that m and n are each independently at least 1, and p, q, and r are each independently zero or a positive integer.

2. The composition of claim 1 wherein the fluoroalkyl phosphate is a mixture of from about 15 to about 80 mole % mono(perfluoroalkylethyl) phosphate and from about 20 to about 85 mole % bis(perfluoroalkylethyl) phosphate.

3. The composition of claim 1 wherein the fluoroalkyl phosphate contains an $R_f$ group of formula $F(CF_2CF_2)_d(CH_2)_a$—.

4. The composition of claim 1 wherein the ratio of m:n is from 1:2 to 1:6, the ratio of m:p is from 1:0.5 to 1:0, the ratio of m:q is from 1:1 to 1:0, and the ratio of m:r is 1:0.1 to 1:0.

5. The composition of claim 1 wherein for the fluoroacrylate polymer p, q, r, s and t are each 0 and Z is O.

6. The composition of claim 1 wherein for the fluoroacrylate polymer p, q, s and t are each 0 and Z is O.

7. The composition of claim 1 wherein for the fluoroacrylate polymer q, r, s, and t are each 0 and Z is O.

8. The composition of claim 1 wherein for the fluoroacrylate polymer p, r, s, and t are each 0 and Z is O.

9. The composition of claim 1 wherein in aqueous solution having a total fluorine content of from about 0.2 to 1.5% by weight of the solution.

10. The composition of claim 9 wherein the fluoroalkyl phosphate provides from about 20% to about 95% by weight of the total fluorine content.

11. A method of improving stain resistance of substrate surfaces comprising application of a composition comprising a mixture of a fluoroalkyl phosphate and a fluoroacrylate polymer wherein the fluoroalkyl phosphate is of Formula 1A or 1B Formula 1A

Formula 1B

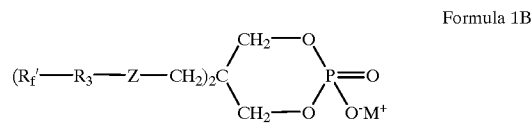

wherein:

$R_f$ is selected from the group consisting of
$F(CF_2CF_2)_d(CH_2)_a$—,
$F(CF_2CF_2)_dCH_2CH_2(OCH_2CH_2)_b$—,
$F(CF_2CF_2)_d$—,
$F(CF_2CF_2)_dCH=CH(CH_2)_c$—, and
$C_8F_{17}SO_2N(R)CH_2CH_2$—, $R_f'$ is a fluoroaliphatic group having a linear or branched perfluorocarbon chain having from 2 to 20 carbon atoms, x is from about 1 to about 2, j is 1 or 0 or a mixture thereof, d is 1 to about 8, or a mixture thereof, X is hydrogen or M, M is an ammonium ion, an alkali metal ion, or an alkanolammonium ion, $R_3$ is an alkylene group having from 1 to about 8 carbon atoms, Z is —O—, —S—, or —NH—, a is from about 2 to about 10, b is from about 3 to about 20, c is from about 2 to about 20, and R is H or an aliphatic group containing 1 to about 4 carbon atoms;

and the fluoroacrylate polymer has the five repeating units 1 to 5 as shown in Formula 2, said repeating units occurring in random distribution, Formula 2

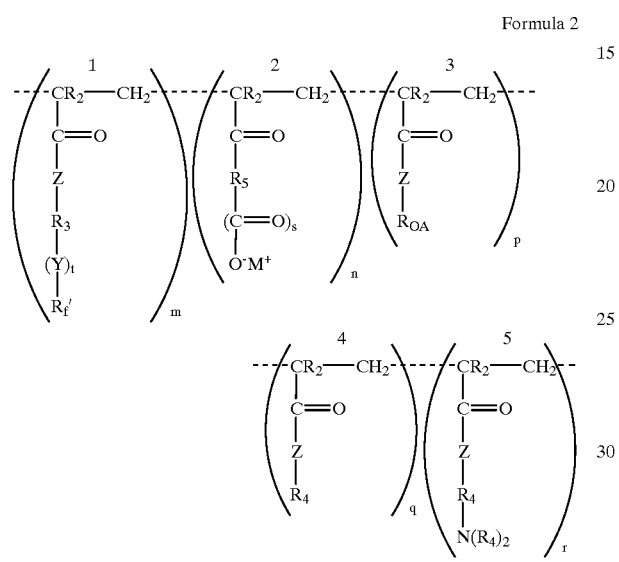

wherein:

each $R_2$ is independently hydrogen or an aliphatic group having from 1 to about 4 carbon atoms, each $R_3$ is independently an alkylene group having from 1 to about 8 carbon atoms, each $R_4$ is independently an aliphatic group having from 1 to about 20 carbon atoms, each $R_5$ is independently a short chain alkylene group having from 1 to about 4 carbon atoms, $R_f'$ is a fluoroaliphatic group having a linear or branched perfluorocarbon chain having from 2 to 20 carbon atoms, $R_{OA}$ is a group of the formula

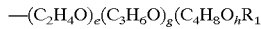

wherein $R_1$ is hydrogen or alkyl having 1 to about 4 carbon atoms, e is 0 to about 20, and g and h are each individually zero or a positive integer, provided that the value of (e+g+h) is equal to or greater than 1, each Z is independently —O—, —S—, or —NH—, Y is —(R)SO$_2$— wherein R is H or an aliphatic group containing 1 to about 4 carbon atoms, M is an ammonium ion, an alkali metal ion, or an anolammonium ion, s and t are each independently 0 or 1, and m, n, p, q, and r are each integers such that m and n are each independently at least 1, and p, q, and r are each independently zero or a positive integer.

12. The method of claim 11 wherein the substrates surfaces are selected from the group consisting of porous concrete, brick, tile, stone, grout, mortar, terrazzo, gypsum board, statuary, monuments, wood, and leather.

13. A substrate having a surface to which has been applied a composition comprising a mixture of a fluoroalkyl phosphate and a fluoroacrylate polymer wherein the fluoroalkyl phosphate is of Formula 1A or 1B Formula 1A

Formula 1B

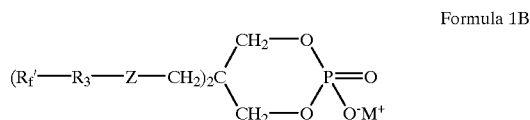

wherein:

$R_f$ is selected from the group consisting of
$F(CF_2CF_2)_d(CH_2)_a$—,
$F(CF_2CF_2)_dCH_2CH_2(OCH_2CH_2)_b$—,
$F(CF_2CF_2)_d$—,
$F(CF_2CF_2)_dCH=CH(CH_2)_c$—, and
$C_8F_{17}SO_2N(R)CH_2CH_2$—, $R_f'$ is a fluoroaliphatic group having a linear or branched perfluorocarbon chain having from 2 to 20 carbon atoms, x is from about 1 to about 2, j is 1 or 0 or a mixture thereof, d is 1 to about 8, or a mixture thereof, X is hydrogen or M, M is an ammonium ion, an alkali metal ion, or an alkanolammonium ion, $R_3$ is an alkylene group having from 1 to about 8 carbon atoms, Z is —O—, —S—, or —NH—, a is from about 2 to about 10, b is from about 3 to about 20, c is from about 2 to about 20, and R is H or an aliphatic group containing 1 to about 4 carbon atoms;

and the fluoroacrylate polymer has the five repeating units 1 to 5 as shown in Formula 2, said repeating units occurring in random distribution, Formula 2

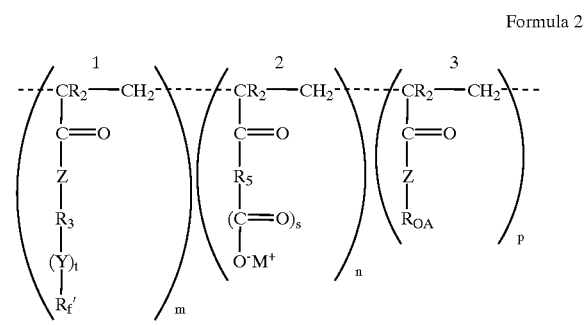

-continued

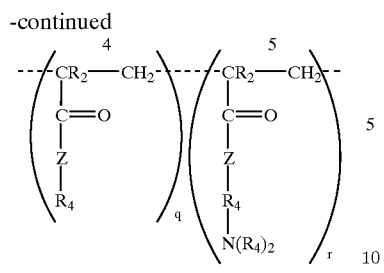

wherein:

each $R_2$ is independently hydrogen or an aliphatic group having from 1 to about 4 carbon atoms, each $R_3$ is independently an alkylene group having from 1 to about 8 carbon atoms, each R4 is independently an aliphatic group having from 1 to about 20 carbon atoms, each $R_5$ is independently a short chain alkylene group having from 1 to about 4 carbon atoms, $R_f'$ is a fluoroaliphatic group having a linear or branched perfluorocarbon chain having from 2 to 20 carbon atoms, $R_{OA}$ is a group of the formula

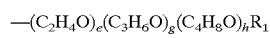

wherein $R_1$ is hydrogen or alkyl having 1 to about 4 carbon atoms, e is 0 to about 20, and g and h are each individually zero or a positive integer, provided that the value of (e+g+h) is equal to or greater than 1, each Z is independently —O—, —S—, or —NH—, Y is —N(R)SO$_2$— wherein R is H or an aliphatic group containing 1 to about 4 carbon atoms, M is an ammonium ion, an alkali metal ion, or an alkanolammonium ion, s and t are each independently 0 or 1, and m, n, p, q, and r are each integers such that m and n are each independently at least 1, and p, q, and r are each independently zero or a positive integer.

* * * * *